United States Patent Office 3,528,798
Patented Sept. 15, 1970

3,528,798
2-PERFLUOROALKYL BENZIMIDAZOLE-PHE-
NOXYALIPHATIC ACID COMBINATIONS AS
HERBICIDES
Rudolf Koloman Pfeiffer, Cambridge, England, assignor
to Fisons Pest Control Limited, Harston, Cambridge-
shire, England
No Drawing. Filed Mar. 25, 1966, Ser. No. 537,296
Claims priority, application Great Britain, Mar. 30, 1965,
13,329/65; Nov. 30, 1965, 50,872/65
Int. Cl. A01n 9/22
U.S. Cl. 71—92
11 Claims

ABSTRACT OF THE DISCLOSURE

An improved herbidical composition is provided which is effective in providing plant growth regulation as well as weed-killing. The composition comprises the admixture of at least one substituted benzimidazole of the formula

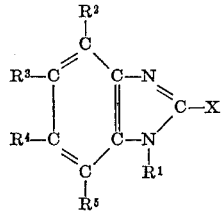

wherein the variable substituents are as defined in the specification together with at least one phenoxyaliphatic acid. Functional derivatives of the components of the composition may also be employed.

---

The present invention relates to an improved herbicidal composition.

It has been found that greatly improved results are obtained by the use in herbicidal compositions of mixtures of substituted benzimidazoles and phenoxyaliphatic acids as hereinafter defined. The two components are more effective, and can be more economically used with greater safety to the crop, when used together. The combination is not merely to extend the spectrum of each compound acting against the species more susceptible to it; the action is synergistic, and the compounds are more active when used together than when used separately as a correspondingly higher dose.

Accordingly the present invention is for a herbicidal composition which comprises a mixture of a substituted benzimidazole as hereinafter defined and a phenoxyaliphatic acid as hereinafter defined. The term herbicidal is intended to cover plant growth regulation as well as simple weed-killing.

By the term "substituted benzimidazole" is meant a substituted benzimidazole of the formula:

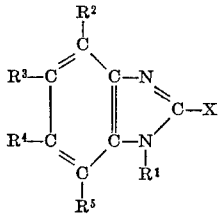

wherein $R^1$ is hydrogen, an alkyl group or $-COOR^6$, where $R^6$ is alkyl (for example of 1–6 carbon atoms, such as methyl, ethyl or propyl), substituted alkyl (for example chloromethyl or bromoethyl), aryl (for example phenyl or naphthyl) or substituted aryl (for example tolyl or xylyl), and $R^2$, $R^3$, $R^4$ and $R^5$ are the same or different and are selected from the group comprising hydrogen, alkyl (for example 1–6 carbon atoms such as methyl, ethyl or propyl), hydroxy, alkoxy (for example methoxy, ethoxy, or butoxy), nitro, halogen (for example chloro, bromo or fluoro), pseudo-halogen (for example cyano, thiocyano, isothiocyano or azido), substituted alkyl (for example trifluoromethyl, chloromethyl, bromomethyl, trichloromethyl, hydroxymethyl, 2 - chloroethyl, 2 - hydroxyethyl or 2 - methoxyethyl), carboxy, carboxy ester, carboxy amide, N substituted or di-substituted carboxy amide, amino or mono- or di-substituted amino (for example methylamino, dimethylamino, acetylamino, trifluoroacetylamino), thiol, alkylthiol and oxygenated derivatives thereof (for example $-SOR^7$ or $-SO_2R^7$ where $R^7$ is alkyl), sulphonic acid and esters and amides thereof, and a heterocyclic ring attached to the benzimidazole system through a nitrogen atom, radicals and where X is trifluoromethyl or pentafluoroethyl, or a salt or functional derivative of said benzimidazole, where such exist.

Salts of the substituted benzimidazoles which may be used in accordance with the present invention include ammonium salts, metal salts such as for example sodium, potassium, calcium, zinc, copper and magnesium salts, amine salts such as for example methylamine, ethylamine, dimethylamine, triethylamine, ethanolamine, triethanolamine and benzylamine salts. According to a preferred embodiment the salts are alkali metal salts. Generally the alkali metal salts are crystalline solids, readily soluble in water. Some of the benzimidazoles are also basic and can form salts with strong acids such as hydrochloric acid.

Examples of the substituted benzimidazoles which may be mentioned include:

4,5-dichloro-2-trifluoromethyl benzimidazole,
5-chloro-6-nitro-2-trifluoromethyl benzimidazole,
4,5,7-tribromo-2-trifluoromethyl benzimidazole,
4-nitro-2-trifluoromethyl benzimidazole,
4,6-dibromo-2-trifluoromethyl benzimidazole,
4-bromo-6-chloro-2-trifluoromethyl benzimidazole,
4-chloro-6-bromo-2-trifluoromethyl benzimidazole,
4,6-dinitro-2-trifluoromethyl benzimidazole,
5-methyl-2-trifluoromethyl benzimidazole,
5-tert.butyl-2-trifluoromethyl benzimidazole,
5-methoxy-2-trifluoromethyl benzimidazole,
5-fluoro-2-trifluoromethyl benzimidazole,
5-amino-2-trifluoromethyl benzimidazole,
4-chloro-2-trifluoromethyl benzimidazole,
4-bromo-2-trifluoromethyl benzimidazole,
5,6-dibromo-2-trifluoromethyl benzimidazole,
4-nitro-6-bromo-2-trifluoromethyl benzimidazole,
4-nitro-5-chloro-2-trifluoromethyl benzimidazole,
4-nitro-6-chloro-2-trifluoromethyl benzimidazole,
4-nitro-5,6-dichloro-2-trifluoromethyl benzimidazole,
4,6-dichloro-6-nitro-2-trifluoromethyl benzimidazole,
4,6-dichloro-5-nitro-2-trifluoromethyl benzimidazole,
4-nitro-5-bromo-2-trifluoromethyl benzimidazole,
5-cyano-2-trifluoromethyl benzimidazole,
5-chloro-2-trifluoromethyl benzimidazole,
5-bromo-2-trifluoromethyl benzimidazole,
5-iodo-2-trifluoromethyl benzimidazole, 4-bromo-6-nitro-2-trifluoromethyl benzimidazole,
1-carboethoxy-4,5,6(5,6,7)-trichloro-2-trifluoromethyl benzimidazole,
1-carboisopropoxy-4,5,6(5,6,7)-trichloro-2-trifluoromethyl benzimidazole,
1-carbomethoxy-4,5,6(5,6,7)-trichloro-2-trifluoromethyl benzimidazole,
5-nitro-2-trifluoromethyl benzimidazole,
4,6-dichloro-2-trifluoromethyl benzimidazole,
4-chloro-6-nitro-2-trifluoromethyl benzimidazole,
4,5,6,7-tetrachloro-2-trifluoromethyl benzimidazole,
4,5,6-trichloro-2-trifluoromethyl benzimidazole,
4,5,7-trichloro-2-trifluoromethyl benzimidazole,
2,5-bis(trifluoromethyl) benzimidazole,
4,5,6-trichloro-2-pentafluoroethyl benzimidazole,
5-nitro-2-pentafluoroethyl benzimidazole, and
Trichloro-morpholino-2-trifluoromethyl benzimidazole By the term "phenoxyaliphatic acid" is meant unsubstituted phenoxyaliphatic acids or substituted phenoxyaliphatic acids, containing substituents such as alkyl and/or halogen and/or other substituents and salts and functional derivatives of such acids. Salts which may be mentioned include alkali metal, metal (for example calcium, magnesium, iron), amine and alkanolamine salts. Functional derivatives which may be mentioned include esters and amides. It is well known that this group of compounds possesses plant physiologically active properties, and that these properties, when present, extend to the salts and functional derivatives. Only a few compounds in this group possess sufficiently high herbicidal or selective herbicidal activity to be used commercially; the synergism which has been found in the mixtures according to the invention is not limited to those phenoxyaliphatic acids which are herbicides, but extends to those compounds whose level of herbicidal activity is so low that they are not recognised as herbicides at all. Examples of the phenoxyaliphatic acids which may be mentioned include 2-methyl-4-chlorophenoxyacetic acid, 2,4-dichlorophenoxyacetic acid, 2,4,5-trichlorophenoxyacetic acid, gamma - 2,4 - dichlorophenoxybutyric acid, gamma-2-methyl - 4 - chlorophenoxybutyric acid, alpha-2-methyl-4-chlorophenoxypropionic acid, 2 - methylphenoxyacetic acid, phenoxyacetic acid, and the like.

In the compositions according to the present invention the substituted benzimidazole and/or the phenoxyaliphatic acid may be used in the form of water insoluble compounds or derivatives, being formulated as oil formulations, aqueous suspensions or emulsions, or wettable powders, usually with wetting agents, or in other ways. It is, however, more convenient to use both the substituted benzimidazole and the phenoxyaliphatic acid in the form of a water soluble salt or derivative, so that this may be formulated as an aqueous solution, with or without wetting agents, and other components commonly included in spray formulations such as antiflocculants, stickers etc.

The sodium and other alkali metal salts of the phenoxyaliphatic acids and the substituted benzimidazole are compatible and stable in aqueous solution. In these mixtures it is preferable to employ similar salts of the two compounds, such as for example alkali metal salts of the two compounds.

The compositions according to the present invention intended use. In general the ratio of substituted benimidazoles with one or more phenoxyaliphatic acids.

In the compositions according to the present invention, the ratio of the substituted benzimidazole to the phenoxyaliphatic acid may vary over a wide range according to the particular compounds involved and the intended use. In general the ratio of substituted benzzimidazole to phenoxyaliphatic acid lies in the range 1:0.1 to 1:15, and preferably in the range 1:0.25 to 1:4, by weight.

According to one embodiment of the invention, the substituted benzimidazole used is according to the formula about wherein $R^1$ is hydrogen and $R^2$, $R^3$, $R^4$ and $R^5$ are selected from hydrogen, halogen and nitro. According to a preferred embodiment of the invention, the substituted benzimidazole is 4,5-dichloro-2-trifluoromethyl benzimidazole.

According to a further preferred embodiment, the invention is for a composition comprising 4,5-dichloro-2-trifluoromethyl benzimidazole, suitably as the sodium or potassium salt, and 2-methyl - 4 - chlorophenoxyacetic acid, suitably as the sodium or potassium salt, in the proportion of one part of the former to 0.25 to 4 parts of the latter, by weight.

The present invention is also for a process for the control of weeds which comprises applying thereto in association a substituted benzimidazole as herein defined and a phenoxyaliphatic acid as herein defined.

The composition according to the present invention may be used for the selective control of weeds in crops or for total weed-killing purposes. In the selective control of weeds in crops, the compositions are generally used as post-emergence dressings and may be used in this way for example for the control of weeds in cereals, grassland, sugar-cane and rice crops. The compositions may also be used as pre-emergence dressings.

The weeds which are controlled by the compositions according to the present invention include *Galium aparine* (cleavers), *Stellaria media* (chickweed), *Polygonum convolvulus* (black bindweed), *Anthemis cotula* (mayweed).

The compositions according to the invention are of particular value in the control of weeds in crops and the composition is more effective and more economical than the components used alone. Thus for example a herbicidally active phenoxyaliphatic acid such as 2-methyl-4-chlorophenoxy-acetic acid amplifies the effect of the substituted benzimidazole on cleavers, although 2-methyl-4-chlorophenoxyacetic acid itself has no effect on cleavers. Similarly a substantially herbicidally inactive phenoxyaliphatic acid such as 2-methylphenoxyacetic acid amplifies the effect of the substituted benzimidazole. The compositions according to the invention thus exhibit synergism.

The synergism thus exhibited is all the more surprising as no specially advantageous results are obtained from the use of mixtures of the substituted benzimidazoles with herbicides such as aminotriazole, trichloroacetic acid or 2,2-dichloropropionic acid or with known activators for herbicides such as ammonium thiocyanate or ammonium sulphate.

All amounts and ratios quoted in the specification and claims, whether salts or derivatives are used or not, are based on the substituted benzimidazole and phenoxyaliphatic acid per se (i.e. acid equivalent) in accordance with standard practice.

The compositions according to the present invention may include any of the usual components such as surface active agents, stickers, diluents and other additives used in the art. The compositions may be liquids or wettable powders suitable for spraying for example in aqueous media or powders suitable for dusting. The extent of dilution of the compositions, for example in water, for spraying appears to be non-critical. The compositions may also contain other active ingredients such as herbicides or pesticides.

The following examples are given to illustrate the present invention; the parts and percentages are by weight. The rates of application are quoted as ounces (oz.) per acre and as equivalent grams (g.) or kilograms (kg.) per hectare.

EXAMPLE 1

Compositions were prepared of 2-trifluoromethyl-4,5-dichloro benzimidazole (Compound A) with 2-methyl-4-chlorophenoxyacetic acid (MCPA) in different ratios.

In each case the compounds were in the form of the sodium salts.

Cleaver seedings were grown in pots in the greenhouse for six weeks and were then sprayed with the compositions at the rates indicated below diluted in 30 gallons (136 litres) of water. Assesment of plant tissue killed when examined after 14 days is shown below. Solely by way of comparison Compound A and MCPA were tested individually, and the results are also indicated below.

| Rates per hectare | Rates per acre | Tissue damage |
| --- | --- | --- |
| 1.12 kg. A plus 1.12 kg. MCPA | 16 oz. Compound A plus 16 oz. MCPA | 100 |
| 560 g. A plus 1.12 kg. MCPA | 8 oz. Compound A plus 16 oz. MCPA | 25 |
| 1.12 kg. A | 16 oz. Compound A | 67 |
| 560 g. A | 8 oz. Compound A | 5 |
| 2.24 kg. MCPA | 32 oz. MCPA | 0 |

EXAMPLE 2

Compositions were prepared of 2-trifluoromethyl-4,5,7-trichloro benzimidazole (Compound B) with 2-methyl-4-chlorophenoxyacetic acid (MCPA) in different ratios. The compounds were in the form of the sodium salts.

Cleaver seedlings were grown in pots in the greenhouse for 10 weeks and were then sprayed with the compositions at the rates indicated below diluted in 30 gallons (136 litres) water. Assessment of plant tissue killed when examined after 14 days is shown below. Solely by way of comparison Compound B and MCPA were tested individually, and the results are also indicated below.

| Rates per hectare | Rates per acre | Tissue damage |
| --- | --- | --- |
| 2.24 kg. B plus 1.68 kg. MCPA | 32 oz. Compound B plus 24 oz. MCPA | 80 |
| 1.12 kg. B plus 1.68 kg. MCPA | 16 oz. Compound B plus 24 oz. MCPA | 61 |
| 560 g. B plus 1.68 kg. MCPA | 8 oz. Compound B plus 24 oz. MCPA | 57 |
| 2.24 kg. B | 32 oz. Compound B | 43 |
| 1.12 kg. B | 16 oz. Compound B | 24 |
| 560 g. B | 8 oz. Compound B | 15 |
| 2.24 kg. MCPA | 32 oz. MCPA | 0 |

EXAMPLE 3

Compositions were prepared of 2-trifluoromethyl-4,5,7-trichloro benzimidazole (Compound C) with 2-methyl-4-chlorophenoxypropionic acid (CMPP) in different ratios. Cleaver seedlings grown in pots in the greenhouse for 6 weeks were sprayed with the compositions at the rates indicated below. Assessment of tissue damage as percent scorch was made 6 days after spraying and is shown below. Solely by way of comparison Compound C and CMPP were tested individually and the results are also indicated below.

| Rates per hectare | Rates per acre | Tissue damage |
| --- | --- | --- |
| 1.12 kg. C plus 2.24 kg. CMPP | 16 oz. Compound C plus 32 oz. CMPP | 75 |
| 560 g. C plus 2.24 kg. CMPP | 8 oz. Compound C plus 32 oz. CMPP | 50 |
| 280 g. C plus 2.24 kg. CMPP | 4 oz. Compound C plus 32 oz. CMPP | 35 |
| 1.12 kg. C plus 1.12 kg. CMPP | 16 oz. Compound C plus 16 oz. CMPP | 60 |
| 560 g. C plus 1.12 kg. CMPP | 8 oz. Compound C plus 16 oz. CMPP | 50 |
| 280 g. C plus 1.12 kg. CMPP | 4 oz. Compound C plus 16 oz. CMPP | 35 |
| 1.12 kg. C plus 560 g. CMPP | 16 oz. Compound C plus 8 oz. CMPP | 55 |
| 560 g. C plus 560 g. CMPP | 8 oz. Compound C plus 8 oz. CMPP | 40 |
| 280 g. C plus 560 g. CMPP | 4 oz. Compound C plus 8 oz. CMPP | 30 |
| 1.12 kg. C | 16 oz. Compound C | 17 |
| 2.24 kg. CMPP | 32 oz. CMPP | 15 |

EXAMPLE 4

Compositions were prepared of 2-trifluoromethyl-4,5-dichloro benzimidazole (Compound D) with 2-methylphenoxyacetic acid (Compound M) in different ratios.

In each case the compounds were in the form of the sodium salts.

Cleaver seedlings were grown in pots in the greenhouse for six weeks and were then sprayed with the compositions at the rates indicated below diluted in 30 gallons water. Assessment of plant tissue killed when examined after 14 days is shown below. A score of 100 represents complete kill; 0 represents no ascertainable damage. Solely by way of comparison Compound D and Compound M were tested individually, and the results are also indicated below.

| Rates per hectare | Rates per aere | Tissue damage |
| --- | --- | --- |
| 1.12 kg. D plus 1.12 kg. M | 16 oz. Compound D plus 16 oz. Compound M. | 86 |
| 560 g. D plus 1.12 kg. M | 8 oz. Compound D plus 16 oz. Compound M. | 73 |
| 280 g. D plus 1.12 kg. M | 4 oz. Compound D plus 16 oz. Compound M. | 33 |
| 140 g. D plus 1.12 kg. M | 2 oz. Compound D plus 16 oz. Compound M. | 7 |
| 1.12 kg. D | 16 oz. Compound D | 68 |
| 560 g. D | 8 oz. Compound D | 31 |
| 280 g. D | 4 oz. Compound D | 3 |
| 140 g. D | 2 oz. Compound D | 1 |
| 4.48 kg. M | 64 oz. Compound M | 0 |
| 2.24 kg. M | 32 oz. Compound M | 0 |
| 1.12 kg. M | 16 oz. Compound M | 0 |

EXAMPLE 5

Compositions were prepared containing a mixture of 2-methyl-4-chlorophenoxyacetic acid (MCPA) and 5-chloro-6-nitro-2-trifluoromethyl benzimidazole (Compound E) (each as the sodium salt) at different ratios.

These were sprayed at the rates indicated below in a dilution of 40 gallons per acre (448 litres per hectare) onto cleaver seedlings with 3½–4 whorls of leaves, mayweed seedlings with 6–7 leaves and redshank seedlings with 3½–4 leaves. The plants were grown under controlled environment conditions and assessed for plant damage 14 days after spraying. The results are tabulated below.

By way of comparison, MCPA and Compound E were also sprayed individually and assessment made in a similar way.

| Rate per hectare | Rate per acre | Plant tissue damage—species | | |
|---|---|---|---|---|
| | | Cleavers | Mayweed | Redshank |
| 140 g. E plus 840 g. MCPA | 2 oz. Compound E plus 12 oz. MCPA | 64 | 100 | 100 |
| 70 g. E. plus 840 g. MCPA | 1 oz. Compound E plus 12 oz. MCPA | 55 | 85 | 90 |
| 140 g. E | 2 oz. Compound E | 45 | 45 | 70 |
| 1.68 kg. MCPA | 24 oz. MCPA | 10 | 30 | 50 |

EXAMPLE 6

Compositions were prepared containing a mixture of 2-methyl-4-chlorophenoxyacetic acid (MCPA) and 5-bromo-2-trifluoromethyl benzimidazole (Compound F) (each as the sodium salt) at different ratios.

These were sprayed onto mayweed seedlings with 6–7 leaves at the rates per acre indicated below in a dilution of 40 gallons per acre (448 litres per hectare). The plants were grown under controlled environment conditions and then assessed for plant tissue damage after 14 days. The results are tabulated below.

By way of comparison, Compound F and MCPA were also tested individually and these results are also tabulated below.

| Rates per hectare | Rates per acre | Tissue damage |
|---|---|---|
| 560 g. F plus 840 g. MCPA | 8 oz. Compound F plus 12 oz. MCPA | 90 |
| 280 g. F plus 840 g. MCPA | 4 oz. Compound F plus 12 oz. MCPA | 45 |
| 560 g. F | 8 oz. Compound F | 17 |
| 1.68 kg. MCPA | 24 oz. MCPA | 25 |

I claim:
1. A herbicidal composition which consists essentially of a herbicidally effective amount of a mixture of (A) at least one substituted benzimidazole of the formula:

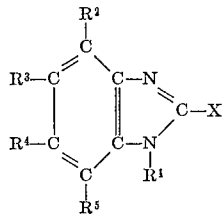

wherein
$R^1$ is hydrogen;
$R^2$, $R^3$, $R^4$ and $R^5$ are selected from the group consisting of hydrogen, nitro, halogen, cyano and trifluoromethyl; and
X is selected from the group consisting of trifluoromethyl and pentafluoroethyl; and metal, ammonium or amine salts thereof; together with (B) at least one phenoxyaliphatic acid of the formula

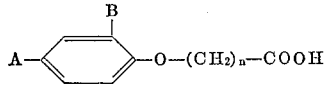

wherein A and B are selected from the group consisting of hydrogen, methyl and chloro, not more than one of A and B being hydrogen, and wherein $n$ is 1 or 2, and salts, esters and amides thereof, wherein the ratio of the substituted benzimidazole to the phenoxy aliphatic acid is in the range of 1:0.1 to 1:15 by weight.

2. A herbicidal composition as claimed in claim 1 wherein the ratio of the substituted benzimidazole to the phenoxyaliphatic acid is in the range 1:0.25 to 1:4 by weight.

3. A herbicidal composition as claimed in claim 1 wherein the substituted benzimidazole is 4,5-dichloro-2-trifluoromethyl benzimidazole.

4. A herbicidal composition as claimed in claim 1 wherein the phenoxyaliphatic acid is selected from the group consisting of 2,4-dichlorophenoxyacetic acid, 2-methyl-4-chloro-phenoxyacetic acid, alpha-2-methyl-4-chlorophenoxypropionic acid and 2-methylphenoxyacetic acid.

5. A herbicidal composition as claimed in claim 1 wherein the substituted benzimidazole and the phenoxyaliphatic acid are present in the form of their salts.

6. A herbicidal composition as claimed in claim 5 wherein the substituted benzimidazole and the phenoxyaliphatic acid are present in the form of their alkali metal salts.

7. A herbicidal composition as claimed in claim 1 which contains a material selected from the group consisting of surface active agents, stickers and diluents.

8. A herbicidal composition which consists essentially of a herbicidally effective amount of a mixture of 4,5-dichloro-2-trifluoromethyl benzimidazole and 2-methyl-4-chlorophenoxyacetic acid, wherein the ratio of the benzimidazole compound to chlorophenoxyacetic acid compound is in the range of 1:0.1 to 1:15 by weight.

9. A herbicidal composition as claimed in claim 8 wherein the 4,5-dichloro-2-trifluoromethyl benzimidazole and 2-methyl-4-chlorophenoxyacetic acid are in the form of their salts.

10. A herbicidal composition as claimed in claim 8 wherein the 4,5-dichloro-2-trifluoromethyl benzimidazole and 2-methyl-4-chlorophenoxyacetic acid are in the form of their alkali metal salts.

11. A method for the control of weeds which comprises applying to said weeds an effective amount of a herbicidal composition in accordance with claim 1.

References Cited

UNITED STATES PATENTS

| 2,709,648 | 5/1955 | Ryker et al. | 71—113 |
| 3,325,271 | 6/1967 | Goldsmith et al. | 71—82 |
| 3,317,555 | 5/1967 | Goldsmith et al. | 71—92 |
| 3,412,101 | 11/1968 | Zwahlen | 71—92 |

FOREIGN PATENTS

| 1,473,565 | 2/1967 | France. |
| 591,744 | 8/1947 | Great Britain. |
| 598,104 | 2/1948 | Great Britain. |

OTHER REFERENCES

Burton et al.: "2-trifluorobenzimidazoles: A New Class of Herbicidal Compounds" (1965), CA 64, p. 10336 (1966).

Smith et al.: "Some Substituted Benzimidazoles," JACS 75, pp. 1292–94, 1953.

LEWIS GOTTS, Primary Examiner

G. HOLLRAH, Assistant Examiner

U.S. Cl. X.R.

71—65, 108, 113, 116, 118; 260—309.2